(12) United States Patent
Borel et al.

(10) Patent No.: US 11,355,456 B2
(45) Date of Patent: Jun. 7, 2022

(54) ELECTRONIC CHIP WITH PROTECTED REAR FACE

(71) Applicant: COMMISSARIAT A L'ENERGIE ATOMIQUE ET AUX ENERGIES ALTERNATIVES, Paris (FR)

(72) Inventors: Stephan Borel, Crolles (FR); Lucas Duperrex, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/254,846

(22) Filed: Jan. 23, 2019

(65) Prior Publication Data
US 2019/0229073 A1    Jul. 25, 2019

(30) Foreign Application Priority Data

Jan. 25, 2018 (FR) .................................... 18 50604

(51) Int. Cl.
*H01L 23/00* (2006.01)
*G06F 21/87* (2013.01)
(Continued)

(52) U.S. Cl.
CPC ............ *H01L 23/573* (2013.01); *G06F 21/87* (2013.01); *H01L 21/76802* (2013.01);
(Continued)

(58) Field of Classification Search
None
See application file for complete search history.

(56) References Cited

U.S. PATENT DOCUMENTS

| 2010/0018761 A1* | 1/2010 | Wang ................... H01L 21/486 |
| | | 174/260 |
| 2010/0072598 A1* | 3/2010 | Oh ....................... H01L 21/486 |
| | | 257/686 |

(Continued)

FOREIGN PATENT DOCUMENTS

| EP | 2 866 259 A1 | 4/2015 |
| EP | 3 086 368 A2 | 10/2016 |
| WO | WO 2009/116677 A1 | 9/2009 |

OTHER PUBLICATIONS

French Preliminary Search Report dated Nov. 9, 2018 in French Application 18 50604, filed on Jan. 25, 2018 (with English Translation of Categories of Cited Documents).

*Primary Examiner* — Khaja Ahmad
(74) *Attorney, Agent, or Firm* — Oblon, McClelland, Maier & Neustadt, L.L.P.

(57) ABSTRACT

Electronic chip comprising:
an electronic circuit;
a resistive element arranged on a rear face of a substrate;
two conductive vias passing through the substrate, each connected to the electronic circuit and to one of the ends of the resistive element, and masked by the resistive element;
and comprising a weakening structure formed of blind holes such that each of the blind holes comprises a section, at the rear face, of shape and of external dimensions similar to those of the conductive vias, and comprises a portion of the substrate masked by the resistive element,
or in which the resistive element comprises first and second parts spaced apart from each other, arranged one above the other, electrically connected to each (Continued)

other and together forming a coil pattern and/or several alternating, intermingled, wound up or intertwined patterns.

7 Claims, 2 Drawing Sheets

(51) Int. Cl.
    *H01L 21/768*     (2006.01)
    *H01L 23/48*     (2006.01)

(52) U.S. Cl.
    CPC ...... *H01L 21/76898* (2013.01); *H01L 23/481* (2013.01); *H01L 23/576* (2013.01)

(56) References Cited

U.S. PATENT DOCUMENTS

2012/0133427 A1*   5/2012   Kim ........................ H01L 25/16
                                                                              327/564
2015/0108606 A1     4/2015   Lamy et al.
2016/0307855 A1*  10/2016  Charbonnier ......... H01L 23/576

* cited by examiner

ELECTRONIC CHIP WITH PROTECTED REAR FACE

TECHNICAL FIELD AND PRIOR ART

This document relates to the protection of electronic chips, and pertains to an electronic chip notably comprising means, or elements, protecting the rear face of the electronic chip and making it possible to prevent access to the electronic circuit of the chip from its rear face. This document applies to any type of electronic chip: mobile telephone chip, bank card, health card, identity document, etc.

The attacks that an electronic chip can undergo generally have the aim of accessing confidential data stored in the electronic circuit of the chip in order to clone it, to modify the stored information, to wrongfully assume the identity of its owner, etc. An electronic chip may be attacked in multiple ways: chemical, physical, laser, electromagnetic, electric, software, etc.

On a so-called "secure" electronic chip, the front face, that is to say the face of the chip on the side of which the electronic circuit is located, is generally protected by multiple means.

The elements for protecting the front face of the chip may serve to prevent access to the sensitive zones of the electronic circuit. For example, a metal layer arranged at the front face of the chip may form a screen opaque to infrared rays and thereby prevent attacks by faults injection carried out by means of an infrared laser. Moreover, a metal track arranged at the front face of the electronic chip may serve to prevent an attacker from putting test points on sensitive transit or storage information zones in order to read the content thereof.

The elements for protecting the front face of the chip may also serve to detect and inform the electronic circuit of the chip of an attack or an attempted attack in order to trigger a reaction making it possible to protect the coveted data. For example, a photodiode may make it possible, by a light intensity measurement, to detect the use of a laser for the purposes of faults injection into the electronic circuit of the chip.

Conversely, the rear face of the electronic chip is generally less well protected and thus constitutes a favoured access route compared to the front face. Without means for protecting this rear face, nothing stands in the way of the implementation of a thinning of the substrate of the chip from its rear face, or the formation of electronic faults (glitches) by infrared laser, the silicon (which is the material generally used) of the substrate being transparent to wavelengths characteristic of the infrared. The access to the electronic circuit of the chip that is obtained next makes it possible to carry out for example a reading of the data by obtaining the encryption key used in the circuit.

To protect the rear face of a chip, it is possible for example to produce a reflector on the rear face which, coupled to a transmitter/receiver arranged on the front face, makes it possible to verify the integrity of the rear face because in the event of attack by thinning, this reflector is then altered. It is also possible to produce a 3D capacitor enabling, by measurement of capacitance with the substrate, to detect a thinning of the chip through its rear face.

The document EP 3 086 368 A2 proposes an improved solution for protecting the rear face of a chip based on several elements:
- a weakening structure formed of blind holes making it possible to weaken the chip in the event of thinning thereof from its rear face and, when the walls of the blind holes are covered by a metal film, to form a 3D protective screen;
- a resistive element forming a metal coil covering the rear face of the chip and the integrity of which may be verified by measuring its resistance;
- an encapsulation by a polymer opaque to infrared, resistant to FIB (Focused Ion Beam) and more resistant to chemical etching agents ($HNO_3$ notably) than the polymer arranged under the metal coil.

Due to the fact that the blind holes and the electrically conductive vias, or TSVs (Through Silicon Vias), which electrically connect the resistive element (on the rear face) to the electronic circuit (on the front face) are produced during a same etching step for cost reasons, a difference in depth between the TSVs and the blind holes is obtained using the phenomenon of ARDE (aspect ratio dependent etching) according to which a greater etching depth is obtained for the patterns of greatest width during a single etching step. The TSVs must therefore be produced with a section, in the plane of the rear face of the substrate, of greater dimensions than that of the blind holes.

The drawback of this is that, on the side of the rear face of the electronic chip, the TSVs can be recognised visually by their larger section than that of the blind holes. This thus enables an attacker to locate easily the ends of the resistive element. This localisation of the ends of the resistive element makes possible the measurement of the value of the electrical resistance at the terminals of the resistive element, then a connection of an electrical resistance of same value to the terminals of the TSV. It is then possible to cut the resistive element without triggering a reaction of the part of the electronic circuit since it measures the same value of electrical resistance.

DESCRIPTION OF THE INVENTION

Thus there is a need to propose an electronic chip including a protected rear face and which does not have the drawbacks of the prior art, that is to say including a resistive element for protecting its rear face of which the ends are difficult to identify.

To do so, one embodiment proposes an electronic chip comprising at least:
- an electronic circuit arranged on the side of a front face of a substrate;
- a resistive element arranged on the side of a rear face of the substrate (which is opposite to the front face of the substrate) and directly in line with at least one part of the electronic circuit;
- two electrically conductive vias, or TSVs, passing through the substrate and extending between the front and rear faces of the substrate, each electrically connected to the electronic circuit and to one of at least two ends of the resistive element such that the value of the electrical resistance of the resistive element can be measured by the electronic circuit, and masked at least partially by the resistive element on the side of the rear face of the substrate;
- and further comprising a weakening structure formed of blind holes such that:
- each of the blind holes passes through the rear face of the substrate and a part of the thickness of the substrate,
- each of the blind holes comprises a section, at the rear face of the substrate, of shape and external dimensions substantially similar to those of each of the electrically conductive vias, and in each of the blind holes, a portion of the substrate extends between the rear face of the substrate and a bottom wall of the blind hole and is masked by the resistive element on the side of the rear face of the substrate, and/or in which the resistive element comprises first and second parts spaced apart from each other, arranged at least partially one above the other such that the first part is arranged between the rear face of the substrate and the second part, electrically connected to each other, and together forming at least one coil, or serpentine, pattern and/or several alternating, intermingled (or entangled), wound up or intertwined patterns.

The resistive element may comprises first and second parts spaced apart from each other, arranged at least partially one above the other such that the first part is arranged between the rear face of the substrate and the second part, electrically connected to each other, and together forming at least one coil pattern, or several alternating patterns, or several intermingled patterns, or several wound up patterns, or several intertwined patterns.

By producing a weakening structure as specified above, it is impossible to distinguish optically the electrically conductive vias compared to the blind holes of the weakening structure. Indeed, the pattern of the blind holes is such that each comprises a section, at the rear face of the substrate, which is of shape and external dimensions (that is to say the shape and the dimensions of each of the blind holes at its periphery) that are substantially similar to those of each of the electrically conductive vias, and such that at least one portion of the substrate is intended to be kept in each blind hole. Thus, the surface of material of the substrate exposed to the etching to form each of the blind holes is smaller than that exposed to form the electrically conductive vias. The result is that for a same etching duration, on account of the phenomenon of ARDE, the depths of the blind holes obtained are less than those of the vias. Moreover, due to the fact that the resistive element masks the portions of the substrate present in the blind holes on the side of the rear face of the substrate, it is impossible to visually make a distinction, on the side of the rear face of the electronic chip, between the electrically conductive vias and the blind holes. Thus, an attacker wishing to locate the electrically conductive vias to access the ends of the resistive element has no other choice but to test all of the holes (blind holes and vias) in order to check whether it is a blind hole or an electrically conductive via, which can take time and has the consequence of altering the resistive element and thus making this attack detectable by the electronic chip.

Moreover, this configuration of the weakening structure does not modify its first function, namely to form a protection vis-à-vis a mechanical thinning or a polishing of the electronic chip from its rear face, as well as vis-à-vis an attack by FIB or by chemical etching of the rear face of the electronic chip.

Thanks to the presence of the resistive element on the rear face of the electronic chip, if a mechanical thinning or polishing of the rear face of the electronic chip is implemented, this thinning or this polishing causes the alteration of the resistive element. This alteration of the resistive element is then detected by the electronic circuit of the chip which could, for example, go on default. In addition, by producing the resistive element with two superimposed parts as specified above, it is very difficult to locate the two ends of this resistive element, the first part of the resistive element being masked at least partially by the second part of the resistive element. The whole of the pattern of the resistive element thus cannot be apprehended visually by an attacker from the rear face of the electronic chip. The complex shape of the resistive element contributes to preventing an attack consisting in replacing the resistive element by an equivalent electrical resistance in order to access the electronic circuit from the rear face of the electronic chip.

The pattern of the resistive element is formed by the whole of the resistive element, that is to say by the first and second parts of the resistive element. The presence of the resistive element on the rear face of the electronic chip also forms a protection vis-à-vis attacks by focused ion beam.

The electronic chip proposed here may thus comprise either the weakening structure described previously, or a resistive element formed of two parts at least partially superimposed one above the other, or a combination of the weakening structure and the resistive element formed of two parts at least partially superimposed one above the other.

Each of the first and second parts of the resistive element may comprise at least one electrically conductive track having at least one coil pattern and/or several alternating, intermingled (or entangled), wound up or intertwined patterns.

Each of the portions of the substrate arranged in the blind holes may form a pillar surrounded by the side walls of one of the blind holes and/or be centred in one of the blind holes. The shape of the portions of the substrate arranged in the blind holes may thus be substantially similar to that of the blind holes. In an alternative, the portions of the substrate present in the blind holes may have shapes other than that of the blind holes and/or not be centred in the blind holes.

When the electronic chip comprises the weakening structure and when the resistive element does not comprise the first and second parts, the resistive element may comprise at least one electrically conductive track having at least one coil pattern and/or several alternating, or intermingled (or entangled), or wound up or intertwined patterns.

The conductive track(s) of the resistive element may have a width between around 1 µm and 20 µm, and/or the portions of the or of one of the conductive tracks which are neighbouring and parallel may be spaced apart from each other by a distance between around 1 µm and 20 µm. Such a configuration of the resistive element thus leaves too little space for an attack by an FIB without this causing a significant modification of the value of the electrical resistance of the resistive element.

The portions of the substrate arranged in the blind holes may have shapes and/or dimensions different from each other, and the distances between the bottom walls of the blind holes and the front face of the substrate may be different from each other. In this configuration, the different depths of the blind holes are obtained by varying the shapes and/or the dimensions of the portions of the substrate that are kept in the blind holes. It is thus possible to obtain blind holes of different depths without this being visible from the rear face of the electronic chip since these blind holes of different depths always have a section, at the rear face of the substrate, of shape and external dimensions substantially similar to each other and to those of each of the electrically conductive vias, and that the portions of the substrate kept in the blind holes are masked by the resistive element on the side of the rear face of the substrate.

The two ends of the resistive element may be formed at the first part of the resistive element. In this case, portions of the second part of the resistive element may be arranged facing two ends of the resistive element, in order to mask these ends and to make them difficult to access.

The pattern(s) of said at least one electrically conductive track of the first part of the resistive element may be different from the pattern(s) of said at least one electrically conductive track of the second part of the resistive element. In such a configuration, the overall pattern of the resistive element is even more complex and thus very difficult to apprehend by an attacker.

Said at least one electrically conductive track of the first part of the resistive element may comprise portions covering the internal walls of the blind holes. This configuration makes the pattern of the resistive element even more complex, thereby making it more difficult to attack.

The invention also pertains to a method for producing an electronic chip as defined above, in which the production of the electrically conductive vias and blind holes comprises the implementation of the following steps:

producing an etching mask on the rear face of the substrate, of which the pattern defines the sections, in a plane parallel to the rear face of the substrate, of the electrically conductive vias, of the blind holes and of the portions of the substrate intended to be kept in the blind holes;

etching through the rear face of the substrate according to the pattern of the etching mask.

Advantageously, the first part of the resistive element and at least one electrically conductive material of the electrically conductive vias may be produced by the implementation of common steps.

BRIEF DESCRIPTION OF THE DRAWINGS

The present invention will be better understood on reading the description of exemplary embodiments given for purely indicative purposes and in no way limiting and by referring to the appended drawings in which.

Identical, similar or equivalent parts of the different figures described hereafter bear the same numerical references so as to make it easier to go from one figure to the next.

The different parts shown in the figures are not necessarily according to a uniform scale, in order to make the figures more legible.

The different possibilities (alternatives and embodiments) should be understood as not being mutually exclusive and may be combined together.

Detailed Description of Particular Embodiments

Figure 1:
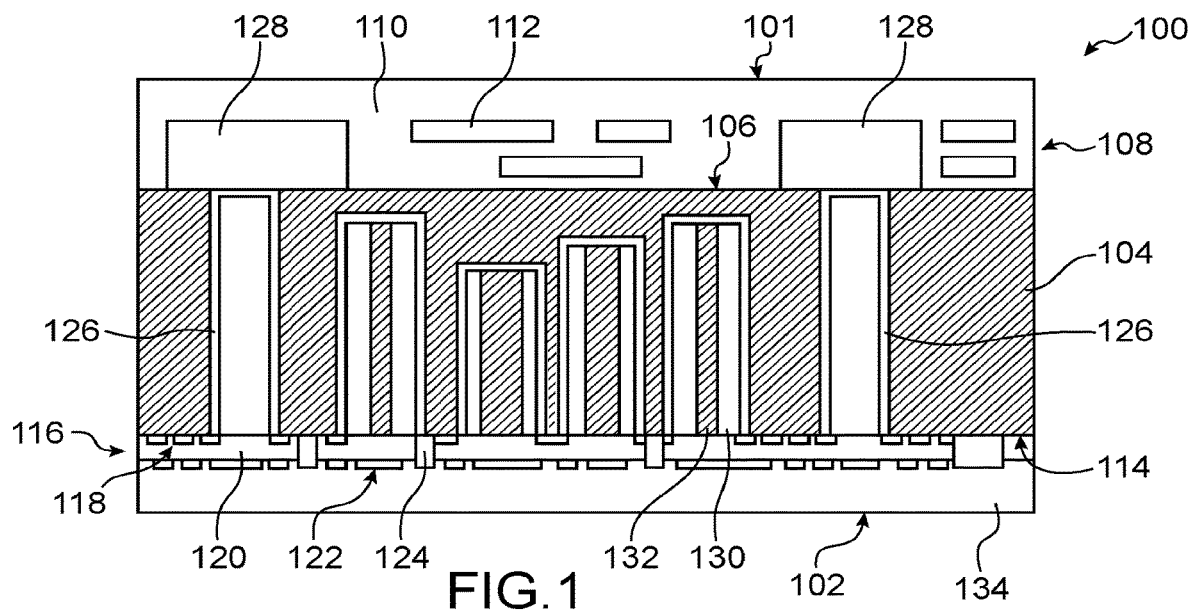
FIG. 1 schematically shows a sectional view of an electronic chip according to a particular embodiment.

Reference is firstly made to FIG. 1 which schematically shows a sectional view of an electronic chip 100 comprising a front face 101 and a protected rear face 102, according to a particular embodiment.

The electronic chip 100 is produced from a substrate 104. The substrate 104 includes for example a semiconductor material such as silicon. The thickness of the substrate 104 is for example equal to around 180 µm when the electronic chip 100 is intended to be arranged in a chip card. Other types of substrate may be used for the production of the electronic chip 100, depending on the final use of the electronic chip 100.

The substrate 104 comprises a front face 106 on which is produced an electronic circuit 108. The electronic circuit 108 comprises a stack of layers 110 (dielectric, metallic, semiconducting) notably forming an active part including electronic components 112 (transistors, memories, etc.) and intended to be protected during potential attacks of the electronic chip 100. Although not described here, the electronic chip 100 may comprise means or elements protecting the electronic circuit 108 from the front face 101.

The substrate 104 also comprises a rear face 114 at which are produced means, or elements, for protecting this rear face 114 of the electronic chip 100.

One of these protective means, or elements, is a resistive element 116. This resistive element 116 is arranged directly in line with at least one part of the electronic circuit 108, and advantageously directly in line with the entire active part of this circuit, on the side of the rear face 114 of the substrate 104.

A first part 118 of this resistive element 116 is formed of one or more electrically conductive tracks arranged substantially at the rear face 114 of the substrate 104. This first part 118 of the resistive element 116 is covered by a dielectric layer 120 on which is arranged a second part 122 of the resistive element 116 also formed of one or more electrically conductive tracks. One or more electrical interconnections 124 electrically connect the first part 118 of the resistive element 116 to the second part 122 of the resistive element 116.

The dielectric layer 120 comprises for example $SiO_2$ and/or SiN, for example deposited by PECVD (plasma enhanced chemical vapour deposition) and of thickness between around 1 µm and 10 µm. The dielectric layer 120 may also comprise at least one polymer material and be deposited by spin coating or by laminating. Each of the parts 118, 122 of the resistive element 116 is for example formed by ECD (electrochemical deposition) or PVD (physical vapour deposition) of copper and/or aluminium and of thickness for example between around 1 µm and 20 µm, and advantageously between around 1 µm and 10 µm.

The second part 122 of the resistive element 116, the parts of the dielectric layer 120 not covered by the second part 122 of the resistive element 116 and the electrical interconnections 124 are covered by a protective layer 134 forming the rear face 102 of the electronic chip 100. This protective layer 134 comprises for example an opaque polymer and serves notably as protection vis-à-vis optical, chemical or instead FIB attacks.

In the particular embodiment described here, the first and second parts 118, 122 together form the resistive element 116 here produced in the form of a coil. The electrically conductive track(s) of each of the first and second parts 118, 122 of the resistive element 116 may have at least one coil pattern and/or several alternating, intermingled or entangled, wound up or intertwined patterns, in order to make it difficult to apprehend the resistive element 116, and notably to make it difficult to identify the location of the two ends of the resistive element 116, in the case of an attempt to attack the electronic chip 100 from its rear face 102.

The different electrically conductive tracks of the first and second parts 118, 122 of the resistive element 116 are electrically connected in series with each other by one or more electrical contacts 124 which pass through the dielectric layer 120. Thus, the resistive element 116 may be formed by an alternation of portions of the first part and of portions of the second part 122. The two ends of the resistive element 116 are advantageously formed at the first part 118 of the resistive element 116 and are each electrically connected to the electronic circuit 108 through an electrically conductive via, or TSV, 126 which passes through the entire thickness of the substrate 104 and emerges on a contact pad 128 of the electronic circuit 108. The electrically conductive vias 126 are filled at least partially by an electrically conductive material ensuring the electrical connection between the ends of the resistive element 116 and the contact pads 128 of the electronic circuit 108. A layer of electrically conductive material, for example the same as that forming the portions of the first part 118 of the resistive element 116, may notably cover the side walls and the bottom walls of the electrically conductive vias 126, the remainder of the volume of the electrically conductive vias 126 being able to be filled by a dielectric material, for example that also serving to form the dielectric layer 120, or instead remain empty.

When the electronic chip 100 is in operation, the value of the electrical resistance of the resistive element 116 is measured between its two ends by the electronic circuit 108. If the electronic chip 100 is attacked from its rear face 102 and when this attack deteriorates the resistive element 116, the value of the electrical resistance measured by the electronic circuit 108 changes and it can then take appropriate measures to deal with this attack.

Producing the resistive element 116 in the form of two parts 118 and 122 superimposed such that the first part 118 is masked at least partially by the second part 122 makes it possible to conceal the ends of the resistive element 116, which makes them difficult to locate by an attacker.

Figure 2:
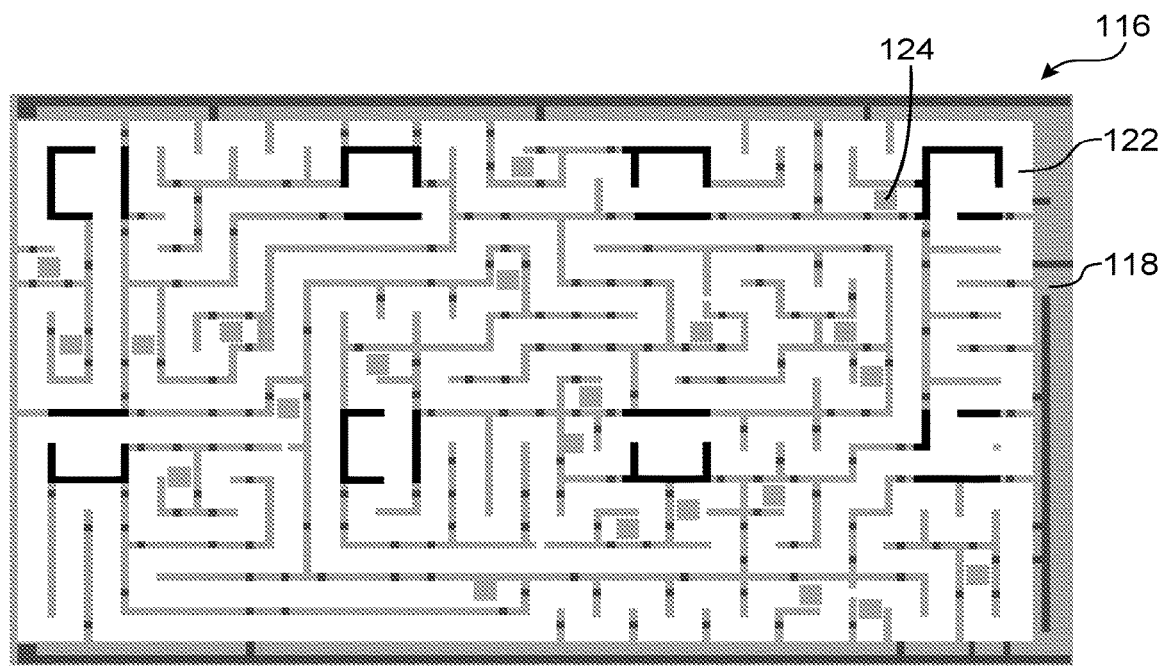
FIG. 2 shows a top view of an exemplary embodiment of a resistive element of the electronic chip according to a particular embodiment.

FIG. 2 shows a top view, on the side of the rear face 102 of the electronic chip 100, of an exemplary embodiment of the resistive element 116. In this figure it may be seen that the two parts 118, 122 of the resistive element 116 cover practically the whole surface of the rear face 114 of the substrate 104, and that the two ends of the resistive element 116 formed at the first part 118 of the resistive element 116 are not visible and cannot be accessed from the rear face 102 of the electronic chip 100.

Another means or element for protecting the rear face 102 of the electronic chip 100 is a weakening structure including blind holes 130 which, unlike the first vias 126, do not pass through the entire thickness of the substrate 104. The blind holes 130 pass through the rear face 114 of the substrate 104 and a part only of the thickness of the substrate 104.

The depth of material of the substrate 104 crossed by the blind holes 130 is not similar to that crossed by the electrically conductive vias 126. However, each of the blind holes 130 comprises a section, at the rear face 114 of the substrate 104, of shape and external dimensions (that is to say at the contour of the blind holes 130) substantially similar to those of each of the electrically conductive vias 126. To obtain this, the patterns of the sections, in a plane parallel to the rear face 114 of the substrate 104, of the blind holes 130 are such that portions 132 of the substrate 104 are intended to be kept in the blind holes 130. Thus, the surface of the substrate 104 exposed to the etching to form each of the blind holes 130 is less than that exposed to make the holes that will serve for the production of the electrically conductive vias 126. During the implementation of an etching step serving to form both the holes of the future vias 126 and the blind holes 130, on account of the phenomenon of ARDE, the depths of the blind holes 130 produced are less than those of the holes intended for the production of the vias 126. The portions 132 extend between the rear face 114 of the substrate 104 and the bottom walls of the blind holes 130.

Figure 3:
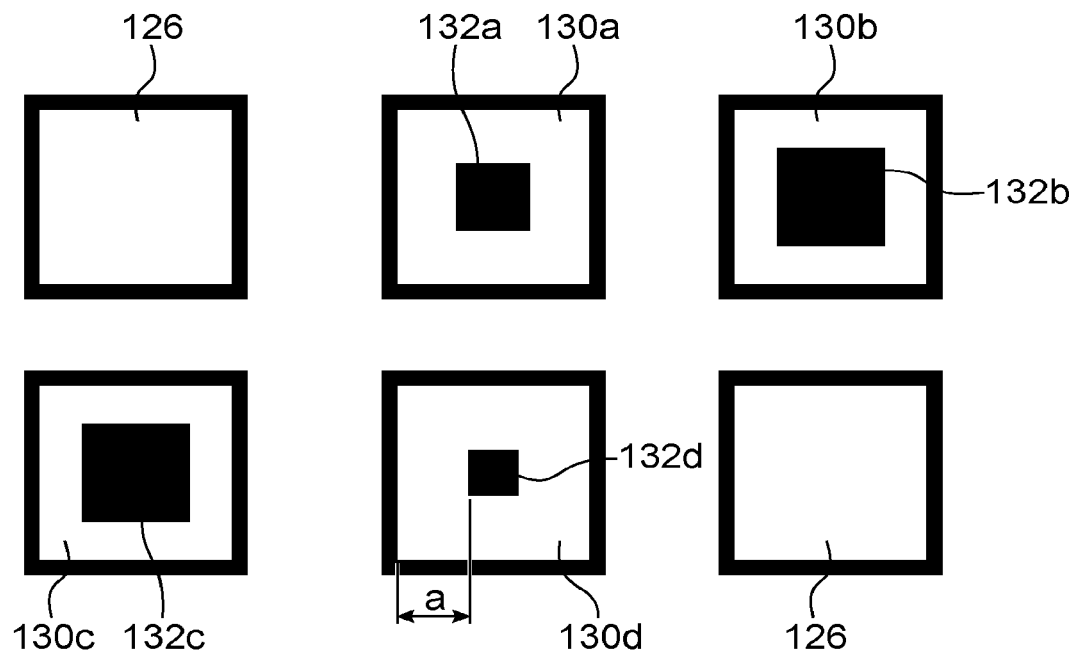
FIGS. 3 and 4 show an exemplary embodiment of electrically conductive vias and blind holes of a weakening structure of an electronic chip according to a particular embodiment.

According to a particular exemplary embodiment, the blind holes 130 are produced such that they have depths different from each other. To do so, at the rear face 114 of the substrate 104, the surfaces and/or the shapes and/or the arrangement of the portions 132 of the substrate 104 which are kept in the blind holes 130 are different from each other. FIG. 3 schematically shows a view of the rear face 114 of the substrate 104 through which are produced the two first vias 126 and four blind holes 130a-130d which extend into the substrate 104 with different depths. The portions 132a-132d kept respectively in the blind holes 130a-130d each comprise, in a plane parallel to the rear face 114 of the substrate 104, a section of square shape but of dimensions different from each other. With such different dimensions, the depths of the blind holes 130a-130d produced are different from each other, as is also the case in the example shown in FIG. 1.

The etching depth obtained during the production of the blind holes 130 depends on the width of the trench (dimension "a" in the example of FIG. 3) formed around the portion 132 and delineated by the external side walls of the blind holes 130, and also on the total etched surface forming the blind hole 130. For each blind hole 130, the etching depth obtained depends on the dimensions of the portion 132 of the substrate 104 that is not etched during the production of the blind hole, and also its positioning with respect to the external side walls of the blind hole 130 in which the portion 132 is kept. As an example, a portion 132 of section (in the plane of the rear face 114 of the substrate 104) of square shape and of sides equal to around 20 μm induces, for a blind hole 130 of section of square shape centred around the portion 132 and of sides equal to around 55 μm, a difference in depth equal to around 20 μm, during the implementation of an etching also forming, through the substrate 104, the holes 126 of section of square shape and of sides equal to around 55 μm and of depth equal to around 200 μm.

In an alternative, it is possible that the blind holes 130 are produced such that they all have the same depth.

Figure 4:
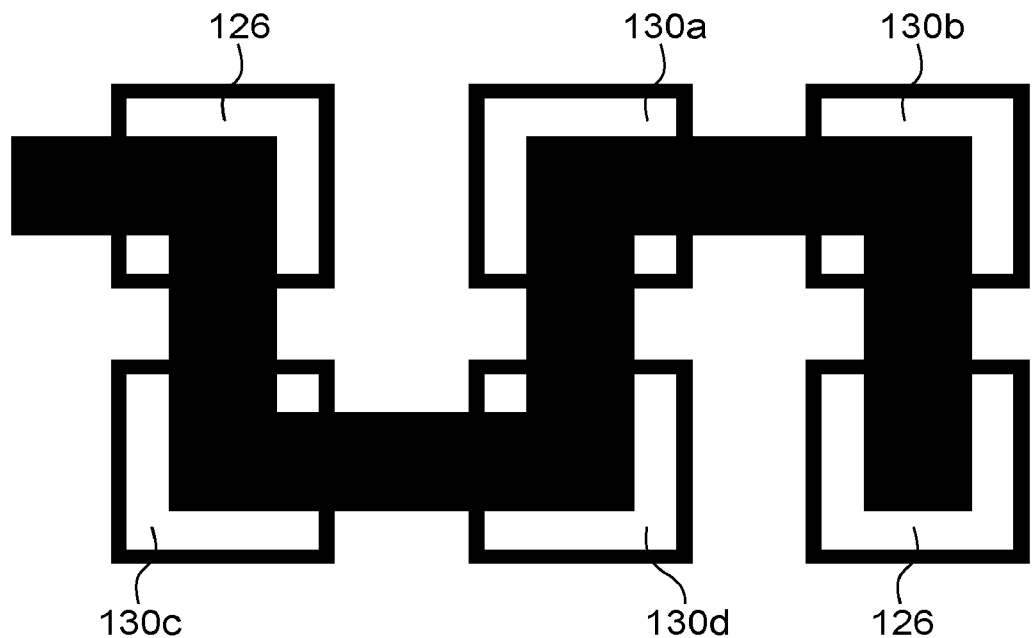

In all cases, in order that the electrically conductive vias 126 cannot be differentiated from the blind holes 130, it is advisable that, from the rear face 102 of the electronic chip 100, the portions 132 of the substrate 104 located in the blind holes 130 are not visible. To do so, the resistive element 116 is produced such that it masks these portions 132. For example, FIG. 4 shows the vias 126 and the blind holes 130a-130d described previously in relation with FIG. 3 and in which are located the portions 132a-132d. The portions 132a-132d are however not visible from the rear face 102 of the electronic chip 100 because a part of the resistive element 116 is arranged facing each of the portions 132 in order to mask them, but also facing the vias 126 in order that these elements can be distinguished from each other.

The diameters or the dimensions of the external sides of the vias 124 and the blind holes 130 are for example between around 10 μm and 100 μm.

The blind holes 130 may be filled with a dielectric material, for example a polymer, and here similar to that filling the remaining volume of the electrically conductive vias 126 not occupied by the electrically conductive material.

Advantageously, the electrically conductive material deposited in the electrically conductive vias 126 to electrically connect the resistive element 116 to the electronic circuit 108 and also being able to serve to produce the first part 118 of the resistive element 116 is also deposited against the side walls and the bottom walls of the blind holes 130.

This makes it possible to make it even more difficult to detect the electrically conductive vias 126.

When the substrate 104 comprises a semiconductor such as silicon, the front and rear faces 106, 114 of the substrate 104 and the side walls of the holes serving for the production of the TSVs 126 and potentially those of the blind holes 130 are covered with a dielectric layer in order to electrically isolate the electrically conductive material arranged in these elements vis-à-vis the semiconductor of the substrate 104.

To produce the electronic chip 100, the following steps are for example implemented:

The components forming the active part of the electronic circuit 108 are firstly produced at the front face 106 of the substrate 104 via the implementation of conventional microelectronic steps. These components form part of the stack of layers 110 that forms the front face 101 of the electronic chip 100. This front face is made integral with a temporary handle formed for example by a semiconductor substrate (for example silicon) or glass, this bonding corresponding for example to an oxide-oxide bonding when the temporary handle comprises a semiconductor or a polymer bonding when the temporary handle comprises glass.

The substrate 104 is next thinned from its rear face until the assembly formed of the substrate 104 and the electronic circuit 108 has the desired thickness, for example less than or equal to around 200 µm.

A hard mask, comprising for example an oxide, is next produced on the rear face 114 of the substrate 104. The pattern of this mask defines the pattern of the holes intended for the production of the electrically conductive vias 126 as well as that of the blind holes 130 and the portions 132 of the substrate 104 intended to be kept in the blind holes 130. The holes of the future vias 126 and the blind holes 130 are next formed through the hard mask by deep etching of the material of the substrate 104.

A dielectric layer is next deposited, for example by PECVD or SACVD (sub-atmospheric chemical vapour deposition), such that it covers the hard mask arranged on the rear face 114 of the substrate 104, as well as the side walls and the bottom walls of the holes of the future TSVs 126 and the blind holes 130. The parts of this dielectric layer deposited on the bottom walls of the holes of the future vias 126 are next eliminated in order that electrical contacts can be produced later with the pads 128 through vias 126 through the substrate 104. If the circuit located on the front face 106 requires that the electrically conductive layer located in the blind holes 130 is electrically isolated from the substrate 104, an additional step of lithography may be inserted in order to protect the blind holes 130 during the step of etching the insulating layer at the bottom of the TSVs 126.

The electrically conductive layer forming the conductive material of the vias 126 as well as the first part 118 of the resistive element 116 is next produced for example by the implementation of the following steps:

depositing a diffusion barrier layer, comprising for example a Ti/TiN bilayer (Ti deposited for example by PVD and TiN deposited for example by MOCVD, or metal organic chemical vapour deposition), on the dielectric layer deposited previously as well as at the side walls and the walls of the bottom of the holes of the vias 126 and of the blind holes 130;

depositing a growth layer, comprising for example copper, on the barrier layer;

lithography of a dry film (of positive or negative resin type) so as to define electrically insulating regions between different parts of the electrically conductive layer produced and electrolytic growth, for example of copper, from the growth layer in the zones where it is exempt of resin patterns;

removing the dry film, then etching the parts of the growth layer and the barrier layer at the insulation regions between the different parts of the electrically conductive layer (for example between the different portions of the first part 118 of the resistive element 116).

The dielectric layer 120 is next deposited, for example by vacuum laminating, on the entire rear face of the structure obtained previously, that is to say on and between the portions of the first part 118 of the resistive element 116. The material of the dielectric layer 120 is for example also deposited such that it fills the remaining empty volumes of the vias 126 and the blind holes 130. Next, the protective layer 120 is etched (or photo-defined if this layer comprises a photosensitive material) in order to form openings that will serve to form the electrical contacts 124.

The second part 122 of the resistive element 116 is next produced for example by the implementation of the following steps:

depositing a diffusion barrier layer, comprising for example a Ti/TiN bilayer, on the dielectric layer 120 and in the openings;

depositing a growth layer, comprising for example copper, on the barrier layer;

lithography of a dry film of which the pattern (that is to say the places where the resin is removed) corresponds to the regions occupied by the second part 122 of the resistive element 116 and electrolytic growth, for example of copper, from the growth layer;

removing the dry film, then etching the parts of the growth layer and of the barrier layer at the regions not occupied by the seconds part 122 of the resistive element 116.

In an alternative, the second part 122 of the resistive element 116 may be produced by PVD followed by lithography and etching.

The protective layer 134 is next deposited, for example via the implementation of spin coating or by laminating, thereby encapsulating the second part 122 of the resistive element 116 as well as the electrical interconnections 124 and certain parts of the first protective layer 120.

The temporary handle is next removed.

In the electronic chip 100 described above, the rear face 102 of the electronic chip 100 is protected by the weakening structure formed of the blind holes 130 and by the resistive element 116 which comprises the two parts 118, 122. In an alternative, it is possible that the resistive element 116 is only produced on a single level, that is to say such that the electrically conductive portions forming this resistive element 116 are uniquely present in a single plane, at the rear face 114 of the substrate 104. According to another alternative, it is possible that the electronic chip 100 does not comprise the weakening structure formed by the blind holes 130 but that the resistive element 116 comprises two parts at least partially superimposed as described previously.

The invention claimed is:

1. An electronic chip comprising:
   an electronic circuit arranged on a front face of a substrate;
   a resistive element arranged on a rear face of the substrate and directly in line with at least one part of the electronic circuit, the resistive element including at least one part covered by a dielectric;
   two electrically conductive vias disposed to pass through the substrate and extend between the front and rear faces of the substrate, each electrically conductive via being connected to the electronic circuit and to one of at least two ends of the resistive element to allow measurement of a value of electrical resistance of the resistive element by the electronic circuit, the two electrically conductive vias being masked by the resistive element on the rear face of the substrate; and a weakening structure formed of blind holes, wherein each of the blind holes passes through the rear face of the substrate and a part of a thickness of the substrate, each of the blind holes comprises a section, at the rear face of the substrate, of shape and external dimensions substantially similar to those of each of the electrically conductive vias, and in each blind hole of the blind holes, at least one portion of the substrate extends between the rear face of the substrate and a bottom wall of the blind hole and is masked by the resistive element on a side of the rear face of the substrate, in each blind hole, the at least one portion of the substrate that extends between the rear face of the substrate and a bottom wall of the blind hole is separated from sidewalls of the blind hole by a gap.

2. The electronic chip according to claim 1, wherein each of the at least one portion of the substrate arranged in the blind holes forms a pillar surrounded by side walls of one of the blind holes or is centered in one of the blind holes.

3. The electronic chip according to claim 1, wherein, when the electronic chip comprises the weakening structure and when the resistive element does not comprise the first and second parts, the resistive element comprises at least one electrically conductive track having at least one coil pattern, or several alternating patterns, or several intermingled patterns, or several wound up patterns, or several intertwined patterns.

4. The electronic chip according to claim 1, wherein the portions of the substrate arranged in the blind holes have shapes or dimensions different from each other, and distances between bottom walls of the blind holes and the front face of the substrate are different from each other.

5. The electronic chip according to claim 1, wherein the two electrically conductive vias are completely masked by the resistive element on the rear face of the substrate.

6. The electronic chip according to claim 1, wherein the blind holes are dimensioned to be visually indistinguishable from the electrically conductive vias.

7. The electronic chip according to claim 1, wherein the gap is empty or filled with a dielectric material.

* * * * *